Patented July 17, 1923.

1,461,957

UNITED STATES PATENT OFFICE.

HARRY H. ALEXANDER, OF WESTFIELD, NEW JERSEY, ASSIGNOR TO AMERICAN SMELTING AND REFINING COMPANY, OF NEW YORK, N. Y., A CORPORATION OF NEW JERSEY.

PROCESS OF RECOVERING TIN FROM IMPURE ORES.

No Drawing. Application filed April 28, 1919, Serial No. 293,183. Renewed April 20, 1922. Serial No. 555,796.

*To all whom it may concern:*

Be it known that I, HARRY H. ALEXANDER, a citizen of the United States, and resident of Westfield, in the county of Union and State of New Jersey, have invented certain new and useful Improvements in Processes of Recovering Tin from Impure Ores, of which the following is a specification.

This invention relates to a process of extracting metallic tin from ores and relates particularly to an improved method of treatment of ores such as Bolivian ores, which carry a considerable percentage of iron, antimony, lead, bismuth and other metals.

In my co-pending application Serial No. 190,290, I have set forth a process of extracting metallic tin which comprises broadly the two steps of sintering or roasting the ores and then subjecting them to the action of a blast furnace, with the object of recovering as much metallic tin as possible directly from the blast furnace.

The present invention relates more particularly to the treatment of the ores, concentrates or similar material in the blast furnace and consists broadly in a process whereby certain of the metals in the ore are first separated prior to the recovery of the metallic tin.

It is well known that tin and iron tend to form an alloy having approximately the formula $FeSn_2$, and that this alloy is very refractory and expensive to treat and that the formation of this alloy in considerable quantities has, prior to my invention set forth in my above recited co-pending application, been considered an insuperable objection to blast furnace treatment of Bolivian ores or similar ferriferous ores containing large quantities of iron and other metals.

The primary object of my invention is to provide a process whereby impure tin ores may be treated on a commercial scale in a modern type of blast furnace without forming an alloy of the tin and the iron contained in the ores.

A further object of the invention is to treat the ores in the blast furnace so as to separate the tin and the iron from the other metals which may be contained in the ore and subsequently to recover the tin.

Still a further object of the invention is to form a fusible slag carrying the tin and the iron and to reduce the other metals contained in the ore to a metallic state.

In carrying out my improved process the ores may be first subjected to a pre-roasting or to a sintering operation in order to agglomerate the same so they may be delivered to the blast furnace without unnecessary loss of fines. This step of the process may be carried out in the usual manner and any one of several forms of apparatus in common use for pre-roasting and sintering operation may be used. If such pre-roasting or sintering appears desirable and necessary in order to remove excess sulphur contained in the ore, sand or silicious flux is mixed with the ore before it is roasted or sintered.

The ore, concentrates or material from the roasting or sintering machine is then placed in a blast furnace of the conventional water jacketed type with a small amount of a suitable reducing agent just sufficient to reduce the metals such as bismuth, antimony, copper and other metals contained in the ore but insufficient to reduce the tin and the iron. The reducing material is preferably coal or coke. The quantity of reducing agent is carefully regulated so that the silicious material present $(SiO_2)$ will reduce the tin oxide $(SnO_2)$ to stannous oxide $(SnO)$ and the ferric oxide $(Fe_2O_3)$ to ferrous oxide $(FeO)$ in which conditions they combine with the $SiO_2$ to form a fusible slag. The other metals such as bismuth, lead, antimony and copper are at the same time reduced to the metallic state and are drawn off through suitable tap holes and may be recovered and refined in any well known manner.

The slag containing the silicates of iron and of tin is then fluxed with lime and reduced with carbonaceous material as coal or coke and subjected to the action of a blast furnace preferably of the conventional water jacketed type. This reduces the silicate of tin to metallic tin and the iron remains in the slag as a silicate of iron. In practice it is often difficult if not impossible to slag all of the tin although theoretically this may be done. However, if the iron is sufficiently low a finished slag carrying only a very small percentage of tin can be made without forming a tin-iron alloy.

The reduction of the silicate of tin to metallic tin may be carried on in a reverberatory furnace instead of in a blast furnace but I prefer to use the blast furnace because it permits handling of a much larger tonnage of material in a given period of time.

By means of this process impure tin ores may be treated in blast furnaces with all the attendant advantages arising from the expeditious handling of a large tonnage of ore. An excellent grade of commercially pure tin is recovered. The formation of the alloy of the tin and of iron commonly known as "hardhead" is avoided although the ore is subjected to the extremely high heat of a modern blast furnace and the temperature is such that, under different conditions, practically all of the tin and the iron would have combined to form this alloy.

Although I have shown and described and have pointed out in the annexed claims, certain novel features of my invention, it will be understood that various omissions, substitutions and changes in the several steps of my process and in its operation and in the form and details of the apparatus illustrated may be made by those skilled in the art without departing from the spirit of the invention.

Having thus described my invention, I claim:—

1. In the art of extracting metallic tin from ores, the process which consists in treating the ore in a blast furnace with suitable material adapted to form silicates of tin, and removing said silicates of tin as a slag.

2. The process of recovering metallic tin from ores containing compounds of iron and other metals, which consists in forming silicates of the tin and the iron, reducing the other metals without reducing said silicates, and removing said silicates as a slag.

3. The process of recovering tin from ores containing compounds of iron and other metals, which consists in adding a reducing agent to the ores in quantity insufficient to reduce the tin and the iron, forming silicates of the tin and the iron and removing said silicates as a slag.

4. In the art of recovering metallic tin from ores containing compounds of iron, antimony and other metals, the process which consists in adding a quantity of carbonaceous material sufficient to reduce the antimony and similar metals without reducing the tin or the iron to the metallic state, and subjecting the mixture to the action of a blast furnace to form silicates of tin and of iron, and then removing said silicates as a slag.

5. The process of recovering metallic tin from ores containing compounds of iron and other metals, which consists in agglomerating the same with silicious materials, subjecting the same to the action of a blast furnace with the addition of a reducing agent insufficient in quantity to completely reduce the iron and the tin, and forming a slag containing the tin and the iron.

6. In the art of recovering metallic tin from ores containing iron and other metals, the process which consists in adding silicious and carbonaceous material thereto so that the silicious material will combine with the tin and the iron, the carbonaceous material being present in predetermined limited quantities insufficient to reduce the tin, treating the same in a blast furnace, and removing the tin and the iron as a slag.

7. In the art of extracting metallic tin from ores containing iron, the process which consists in treating the ore in a blast furnace at a high temperature with suitable material to carry off the tin and the iron as a slag.

8. In the art of extracting metallic tin from ores containing iron, the process which includes the step of treating the ore in a blast furnace with suitable material adapted to form a slag with the tin and the iron.

9. In the art of recovering tin from ores containing oxides of tin and of iron, the process which consists in heating the ore to a high temperature in a blast furnace, partially reducing the oxides of tin and of iron, forming a fusible slag containing said reduced oxides of tin and of iron, and then reducing the tin oxide contained in the slag to metallic tin.

10. In the art of extracting metallic tin from ores the process which consists in treating ores in a blast furnace in combination with suitable material adapted to form a silicious slag with the tin and recovering the tin.

11. In the art of extracting metallic tin from ores the process which consists in treating ores in a blast furnace in combination with suitable material adapted to form a silicious slag with the tin, removing the slag from the furnace, and then treating said slag to recover the tin.

12. The process of recovering metallic tin from ores containing compounds from iron and other metals, which consists in forming a silicious slag with the tin and the iron, simultaneously reducing the other metals, removing said silicious slag, and recovering the tin.

Signed at Maurer, in the county of Middlesex and State of New Jersey, this twenty-eighth day of March, A. D. 1919.

HARRY H. ALEXANDER.